United States Patent
Ramanathan et al.

(10) Patent No.: US 12,156,026 B1
(45) Date of Patent: Nov. 26, 2024

(54) COMPUTING TASK TRANSFERS BETWEEN CELLULAR INFRASTRUCTURE DEVICES

(71) Applicant: Wells Fargo Bank, N.A., San Francisco, CA (US)

(72) Inventors: Ramanathan Ramanathan, Bellevue, WA (US); Chris Theodore Kalaboukis, San Jose, CA (US); Rameshchandra Bhaskar Ketharaju, Hyderabad (IN); Andres J. Saenz, Redmond, WA (US); Andrew J. Garner, IV, State Road, NC (US); Abhijit Rao, Irvine, CA (US); Joon Maeng, Newcastle, WA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 357 days.

(21) Appl. No.: 17/303,778

(22) Filed: Jun. 7, 2021

(51) Int. Cl.
  *H04W 12/06* (2021.01)
  *G06N 5/02* (2023.01)
(52) U.S. Cl.
  CPC .............. *H04W 12/06* (2013.01); *G06N 5/02* (2013.01)
(58) Field of Classification Search
  CPC ................................ H04W 12/06; G06N 5/02
  See application file for complete search history.

(56) References Cited

U.S. PATENT DOCUMENTS

| | | | |
|---|---|---|---|
| 8,510,801 | B2 | 8/2013 | Majmundar et al. |
| 8,830,818 | B2 | 9/2014 | Damnjanovic |
| 9,225,782 | B2 | 12/2015 | Addepalli et al. |
| 9,369,943 | B2 | 6/2016 | Li et al. |
| 9,705,571 | B2 | 7/2017 | Gerszberg et al. |
| 9,749,899 | B2 | 8/2017 | Raleigh et al. |

(Continued)

FOREIGN PATENT DOCUMENTS

| | | | |
|---|---|---|---|
| CN | 112231179 A | * | 1/2021 |
| WO | WO-2018101915 A1 | | 6/2018 |
| WO | WO-2022125456 A1 | * | 6/2022 |

OTHER PUBLICATIONS

Morocho Cayamcela, Manuel Eugenio, et al., "Artificial Intelligence in 5G Technology: A Survey", IEEE. Association for Computing Machinery, (Oct. 30, 2018), 860-865.

*Primary Examiner* — Piotr Poltorak
*Assistant Examiner* — Lydia L Noel
(74) *Attorney, Agent, or Firm* — SCHWEGMAN LUNDBERG & WOESSNER, P.A.

(57) ABSTRACT

In one example, a method includes at a first network infrastructure computing device of a plurality of networked infrastructure computing devices receiving, from a user computing device, an authentication token indicating a user using the user computing device is authenticated with respect to an electronic service, based on the user being authenticated, executing a computing task associated with the electronic service for the user computing device, the computing task including computing task data, predicting a set of possible future locations of the user based on an output of a movement prediction model executing on the first network infrastructure computing device, identifying a set of network infrastructure computing devices correlated with the set of possible future locations, and transmitting the authentication token and the computing task data to the set of network infrastructure computing devices.

17 Claims, 9 Drawing Sheets

(56) References Cited

U.S. PATENT DOCUMENTS

| | | |
|---|---|---|
| 2015/0017985 A1 | 1/2015 | Safavi |
| 2017/0048308 A1 | 2/2017 | Qaisar |
| 2019/0297501 A1 | 9/2019 | Raleigh |
| 2019/0386969 A1* | 12/2019 | Verzun ................. G06F 21/606 |
| 2021/0144517 A1* | 5/2021 | Guim Bernat .......... H04L 67/10 |
| 2021/0160558 A1* | 5/2021 | Sorkin ................. H04N 21/262 |
| 2022/0137865 A1* | 5/2022 | Lee ....................... G06F 3/0655 |
| | | 711/154 |
| 2022/0217186 A1* | 7/2022 | Hannu .................... H04L 67/08 |

* cited by examiner

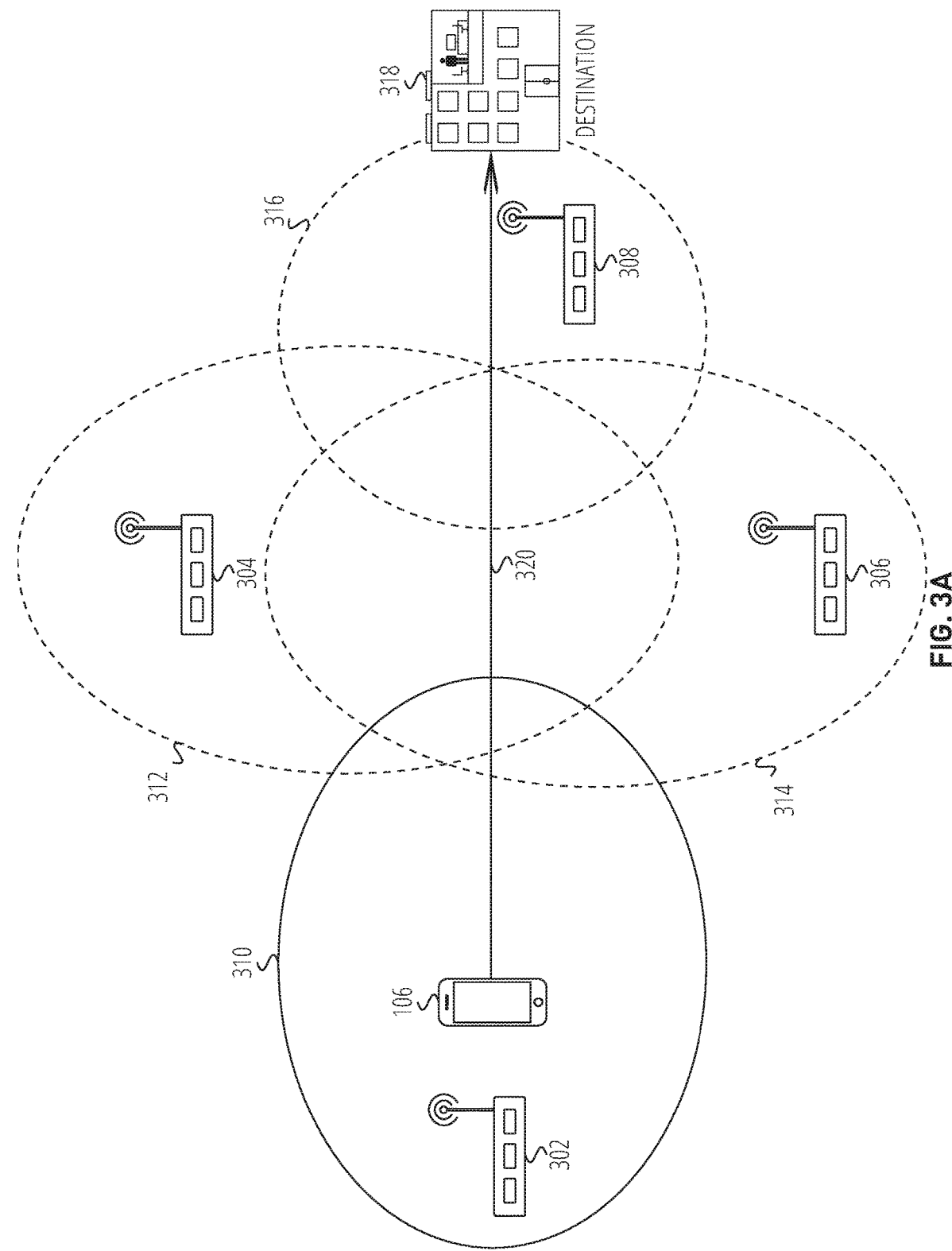

COMPUTING TASK TRANSFERS BETWEEN CELLULAR INFRASTRUCTURE DEVICES

BACKGROUND

As wireless networks mature and evolve, they become increasingly capable of performing high-bandwidth, low latency tasks. Accordingly, the cell that a user device (e.g., a mobile phone, laptop) connect to may perform some a computing task, sometimes referred to as edge computing, rather than use the processing capabilities of the user device.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawing.

FIG. 3A illustrates a client device moving along a route according to various examples.

DETAILED DESCRIPTION

In the following description, for purposes of explanation, numerous specific details are set forth in order to provide a thorough understanding of some example embodiments. It will be evident, however, to one skilled in the art that the present invention may be practiced without these specific details.

Throughout this disclosure, electronic actions may be taken by components in response to different variable values (e.g., thresholds, user preferences, etc.). As a matter of convenience, this disclosure does not always detail where the variables are stored or how they are retrieved. In such instances, it may be assumed that the variables are stored on a storage device (e.g., RAM, cache, hard drive) accessible by the component via an API or other program communication method. Similarly, the variables may be assumed to have a default values should a specific value not be described. User interfaces may be provided for an end-user or administrator to edit the variable values in some instances.

The deployment of high-bandwidth, low latency cellular networks (e.g., 5G) may enable a number of new computing applications such as edge computing using computing power available in base stations of a cellular network. These new applications, however, introduce their own technical problems. For example, although a base station may perform a computational task for a connected device of a user, there may be instances that the task may not be complete before there is a handoff to another base station because the user is moving. Consider further that the task needs to maintain authentication (e.g., a virtual private network (VPN)) to work on a task. In such an instance, the connected device may need to re-authenticate to the remote server each time the device switches to a new base station. In view of these challenges, a new system may be used that minimizes reauthentication and automatically transfers data associated with the task between base stations as a user moves to most efficiently complete the task. In addition to the possibility that the user is a human user, a user may be a drone or autonomous vehicle, in various examples.

Figure 1:
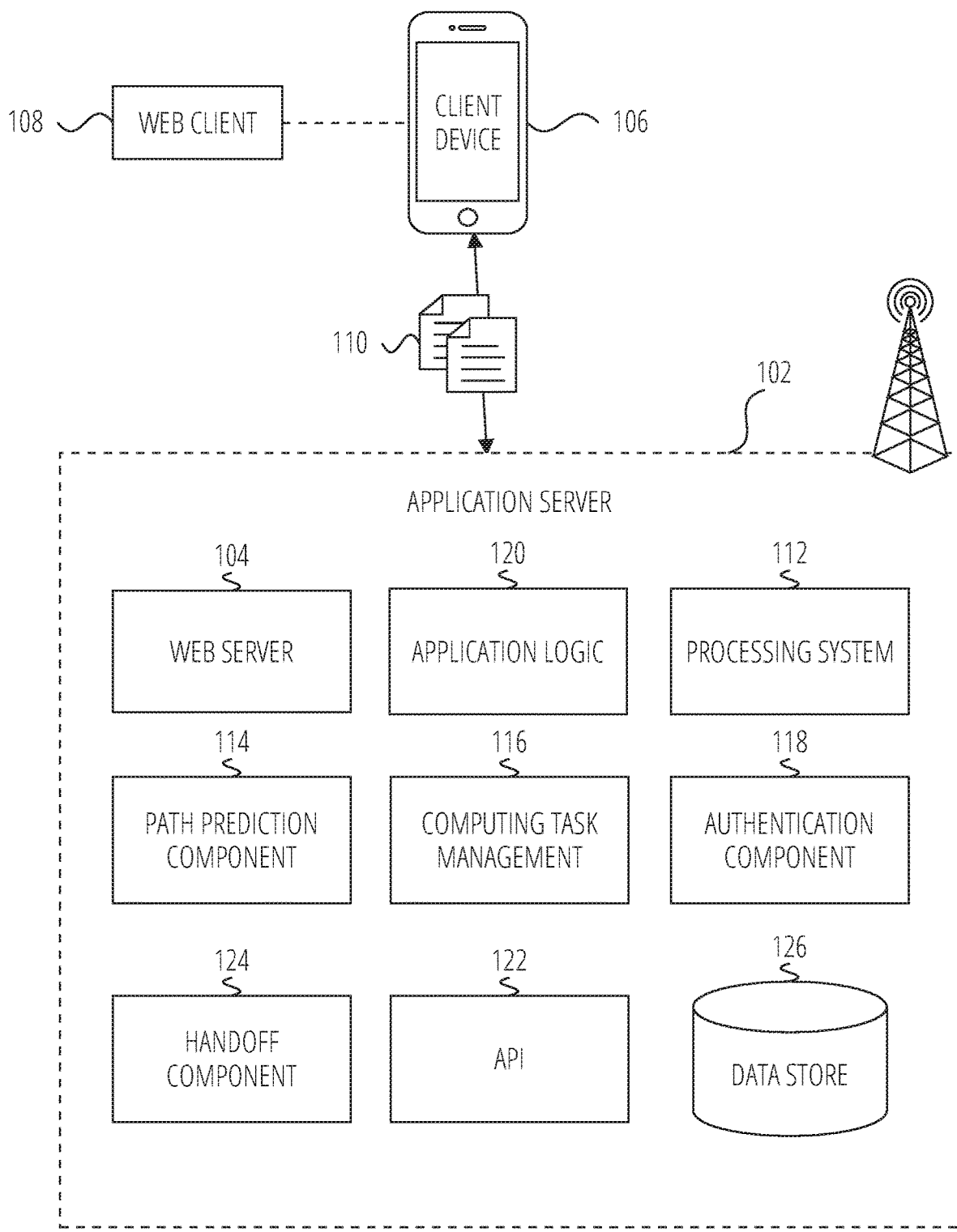
FIG. 1 is an illustration of components of a client device and an application server, according to various examples.

FIG. 1 is an illustration of components of a client device and an application server 102, according to various examples. Throughout this specification, application server 102 is often discussed in the context of application server 102 being part of a cellular base station cell (e.g., a 5G picocell). Thus, the computational tasks of application server 102 may be executed using a same set of available processing units as those that handle the cellular responsibilities (e.g., handoff, etc.) for cellular connected devices. In other examples, application server 102 may be co-located with the base station but use its own dedicated processing architecture. In various examples, application server 102 is not located remote from the base station, and therefore does not use a cloud platform (e.g., MICROSOFT AZURE® and AMAZON EC2®) using shared computing infrastructure for parallel processing.

Application server 102 may be configured to perform computing tasks on behalf of a computing device. For example, running complex machine learning models (e.g., computer vision, image classification, etc.) may utilize more computing resources than are available to run a mobile computing device. In those instances, it may be more efficient to transfer the data that is to be input into the machine learning model to an external computing device (e.g., application server 102).

Client device 106 may be a computing device which may be, but is not limited to, a smartphone, tablet, laptop, multi-processor system, microprocessor-based or programmable consumer electronics, game console, set-top box, or other device that a user utilizes to communicate over a network. In various examples, a computing device includes a display module (not shown) to display information (e.g., in the form of specially configured user interfaces). In some embodiments, computing devices may comprise one or more of a touch screen, camera, keyboard, microphone, or Global Positioning System (GPS) device.

Client device 106 may include capabilities to offload computing tasks to other devices. These capabilities may be implemented in a number of ways. For example, applications may be installed that enable offloading of tasks. In other examples, the operating system (OS) of the client device 106 may include API calls to transfer data for processing at an external device (e.g., application server 102).

Client device 106 and application server 102 may communicate via a network (not shown). The network may include local-area networks (LAN), wide-area networks (WAN), wireless networks (e.g., 802.11 or cellular network), the Public Switched Telephone Network (PSTN) Network, ad hoc networks, cellular, personal area networks or peer-to-peer (e.g., Bluetooth®, Wi-Fi Direct), software defined networks, or other combinations or permutations of network protocols and network types. The network may include a single Local Area Network (LAN) or Wide-Area Network (WAN), or combinations of LAN's or WAN's, such as the Internet. For much of this specification it may be assumed that the network is a high-bandwidth, low latency cellular network (e.g., 5G).

Client device 106 and application server 102 may communicate data 110 over the network. Data 110 may include computing task data. Computing task data may the data that is processed by application server 102 on behalf of the client device 106. For examples, computing task data may be a video file that is being processed by a machine learning model. In other examples, computing task data may be VPN data.

In some examples, the communication may occur using an application programming interface (API) such as API 122. An API provides a method for computing processes to exchange data. A web-based API (e.g., API 122) may permit communications between two or more computing devices such as a client and a server. The API may define a set of HTTP calls according to Representational State Transfer (RESTful) practices. For examples, A RESTful API may define various GET, PUT, POST, DELETE methods to create, replace, update, and delete data stored in a Database (e.g., data store 126)

APIs may also be defined in frameworks provided by an operating system (OS) to access data in an application that an application may not regularly be permitted to access. For example, the OS may define an API call to obtain the current location of a mobile device the OS is installed on. In another example, an application provider may use an API call to request a user be authenticated using a biometric sensor on the mobile device. By segregating any underlying biometric data—e.g., by using a secure element—the risk of unauthorized transmission of the biometric data may be lowered.

Application server 102 is illustrated as set of separate elements (e.g., component, logic, etc.). However, the functionality of individual elements may be performed by a single element. An element may represent computer program code that is executable by processing system 112. The program code may be stored on a storage device (e.g., data store 126) and loaded into a memory of the processing system 112 for execution. Portions of the program code may be executed in a parallel across multiple processing units (e.g., a core of a general purpose computer processor, a graphical processing unit, an application specific integrated circuit, etc.) of processing system 112.

Application server 102 may include web server 104 to enable data exchanges with Client device 106 via web client 108. Although generally discussed in the context of delivering webpages or data via the Hypertext Transfer Protocol (HTTP), other network protocols may be utilized by web server 104 (e.g., File Transfer Protocol, Telnet, Secure Shell, etc.). A user may enter in a uniform resource identifier (URI) into web client 108 (e.g., the INTERNET EXPLORER® web browser by Microsoft Corporation or SAFARI® web browser by Apple Inc.) that corresponds to the logical location (e.g., an Internet Protocol address) of web server 104. In response, web server 104 may transmit a web page that is rendered on a display device of a client device (e.g., a mobile phone, desktop computer, etc.).

Application logic 120 may use the various elements of application server 102 to manage the completion of a computing task and handoff of the computing task to other application servers on other base stations, in various examples. Application logic 120 may use other elements (e.g., path prediction component 114, computing task management 116, authentication component 118, etc.) of application server 102 to perform this functionality as described in more detail below.

Data store 126 may store data that is used by application server 102. Data store 126 is depicted as a singular element, but may in actuality be multiple data stores. The specific storage layout and model used by data store 126 may take a number of forms—indeed, a data store 126 may utilize multiple models. Data store 126 may be, but is not limited to, a relational database (e.g., SQL), non-relational database (NoSQL) a flat file database, object model, document details model, graph database, shared ledger (e.g., blockchain), or a file system hierarchy. Data store 126 may store data on one or more storage devices (e.g., a hard disk, random access memory (RAM), etc.).

As indicated above, application server 102 may be used by client device 106 to perform a computing task. Because, however, the computing task is being performed at a base station, there is the likelihood that client device 106 will no longer be associated with the base station before the computing task is completed. In these scenarios, handoff component 124 may manage transferring any computing task data to the new base station.

Additionally, handoff component 124 may transfer any authentication tokens needed to complete the computing task. For example, client device 106 may be in communication with an electronic service (e.g., a VPN) as part of the computing task. Thus, if a new base station is going to complete the computing task it may need to reauthenticate with the electronic service, introducing delays in the task completion. In order to alleviate this need, the new base station may use the transferred authentication tokens that verify the client device 106 is authenticate with respect to the electronic service.

Computing task management 116 may maintain status information with respect to a task. The status information may include a task identifier and a device identifier associated with the originating requesting device (e.g., client device 106). The device identifier may be an International Mobile Equipment Identity (IMEI) in various examples. The status information may indicate where in the computing task data the current base station is currently at with respect to the computing task. For example, if the computing task is encoding a video file, the status information may include a time stamp of where the encoding stopped or if the computing task is to train a machine learning model, the status information may include what files have been inputted into the model.

Path prediction component 114 may be used by application server 102 to anticipate where client device 106 may travel and find base stations along that path to transfer the computing task data and authentication tokens. Different path prediction models may be used without departing from the scope of this disclosure. For example, path prediction component 114 may access the most frequently visited locations of client device 106 based on the time of day, day of the week, etc. Accordingly, one model may use the current time of the day, day of the week, etc., to find base stations at those most frequently used locations that are within a threshold radius of the location of the client device 106 at the current time.

In other examples, a user may grant location access to application server 102 with respect to third party mapping software or services of the user. For example, client device 106 may be running a navigation application that includes routing information for an intended destination. Using this information, path prediction component 114 may lookup base stations along the route. For example, data store 126 may include a listing of base stations, their locations (e.g., longitude, latitude) and type (e.g., pico) which indicates the base stations coverage range. In other examples, path prediction component 114 may access a travel itinerary of the user to predict the future locations of the user.

Figure 2A:
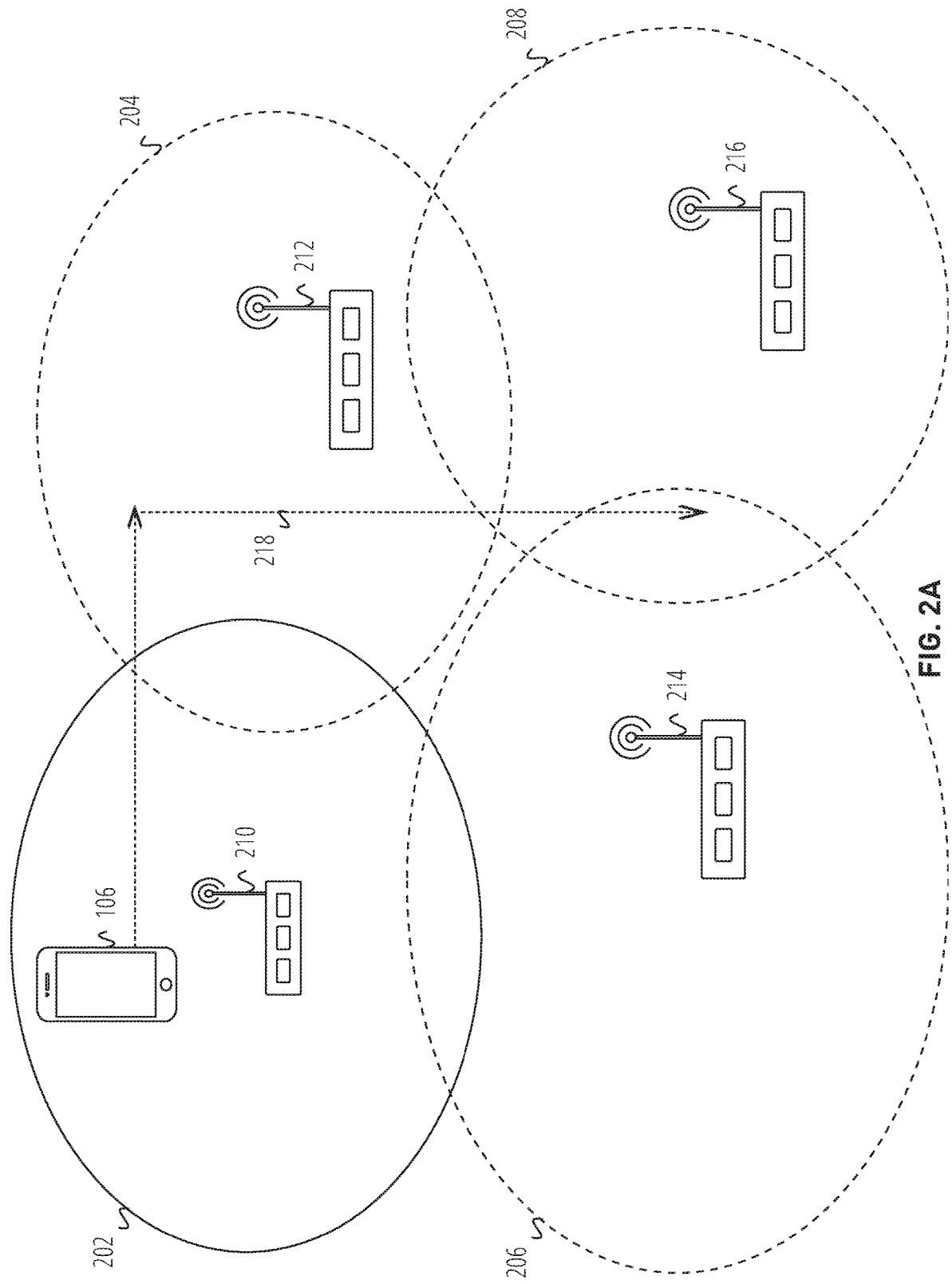
FIG. 2A illustrates a client device moving along a path according to various examples.

FIG. 2A (and FIG. 2B and FIG. 2C) illustrates a client device moving along a path according to various examples. FIG. 2A includes client device 106, coverage range 202, coverage range 204, coverage range 206, coverage range 208, network infrastructure computing device 210, network infrastructure computing device 212, network infrastructure computing device 214, network infrastructure computing device 216, and path 218. In various examples, network infrastructure computing device 210 includes the functionality of application server 102 as discussed with respect to FIG. 1. Thus, application server 102 may include capabilities to manage computing tasks that are being performed on behalf of client devices such as client device 106.

Client device 106 may be a device as discussed with respect to FIG. 1. For example, client device 106 may be a mobile device that is using 5G infrastructure to communicate. An application may be executing on client device 106 that requires computing tasks to be performed that are computational expensive (e.g., require high power, memory, etc.). The task may be associated with an electronic service. The electronic service may be a website, a company's VPN, a server associated that performs authentication of user credentials to be used with the application, or combinations thereof. As such, client device 106 may have been authenticated with respect to the electronic service (e.g., using biometrics, a username/password combination, etc.). For example, consider that the application is a client-side interface for the electronic service and the user has an account that enables a user of the electronic service to perform image recognition in a video file using a remote server. As another example, consider that the electronic service is a VPN running on a remote server associated with electronic service.

Instead of using a remote server, however, which may be located many hundreds or thousands of miles away from client device 106, the electronic service may be performed on a cellular-based infrastructure computing device such as network infrastructure computing device 210. By using network infrastructure computing device 210, the need for several network hops to complete the computing task may be alleviated. For example, if a remote server was used, client device 106 would need to first send the data to network infrastructure computing device 210; which in turn would forward it to the remote server using numerous intermediate network devices. Compounded over many client devices, this would increase network congestion. Additionally, the more network devices that data goes through the higher the security risk that the data may be compromised in some fashion. Finally, if the task is one where speed is of importance, using network infrastructure computing device 210 may reduce any latency as compared to using a remote server.

Network infrastructure computing device 210 may include logic that performs the same task as if it was being completed on a remote server. For example, the electronic service may have a partnership with the providers of network infrastructure computing device 210 (and network infrastructure computing device 212, etc.). As part of this partnership, software code may be transmitted and stored on network infrastructure computing device 210 to perform the computing task. In some examples, the electronic service may deploy its own private or semi-private cellular-based infrastructure computing devices. In various examples, network infrastructure computing device 210 is a software-defined radio.

Figure 2B:
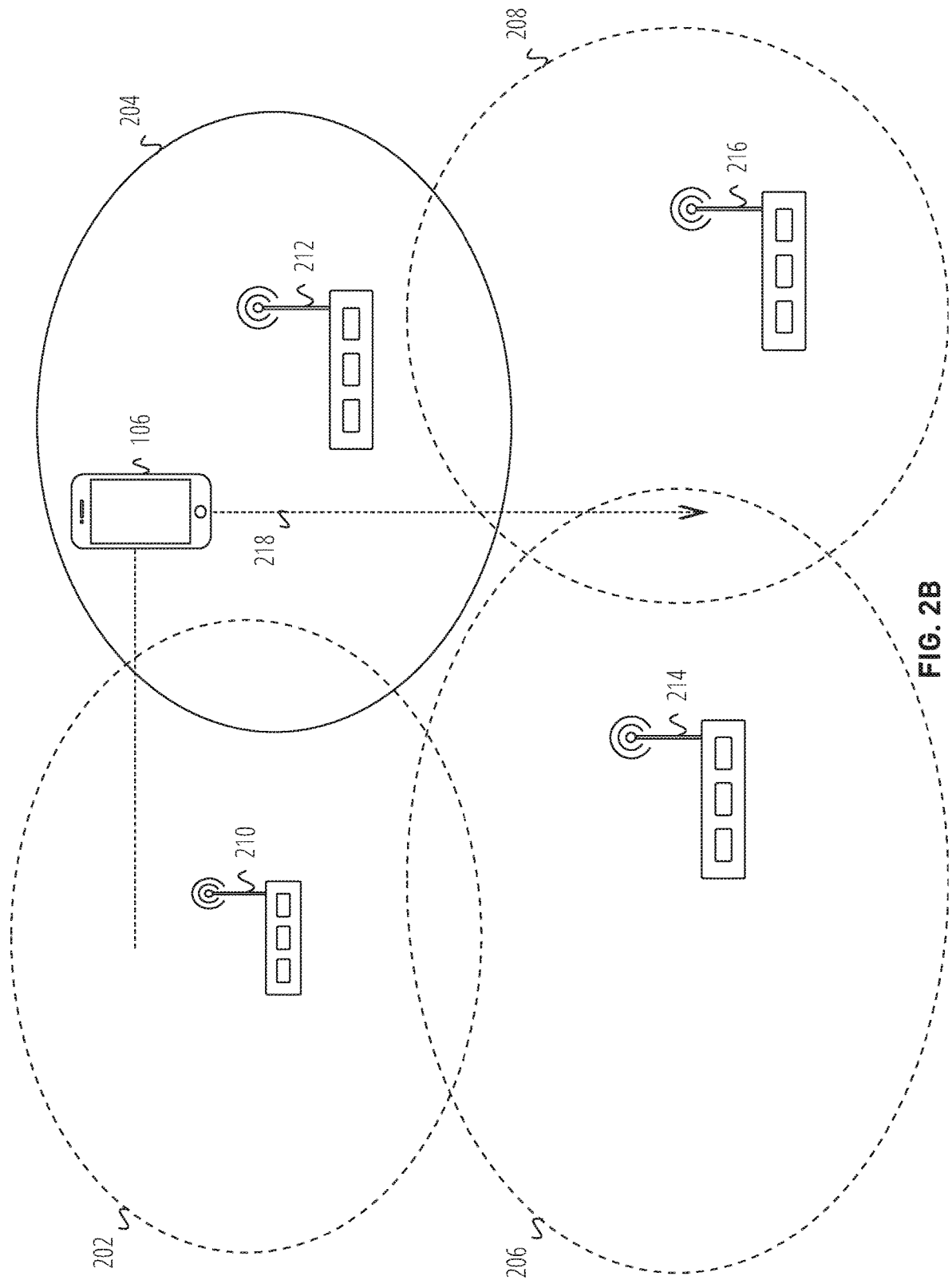
FIG. 2B illustrates a client device moving along a path according to various examples.
Figure 2C:
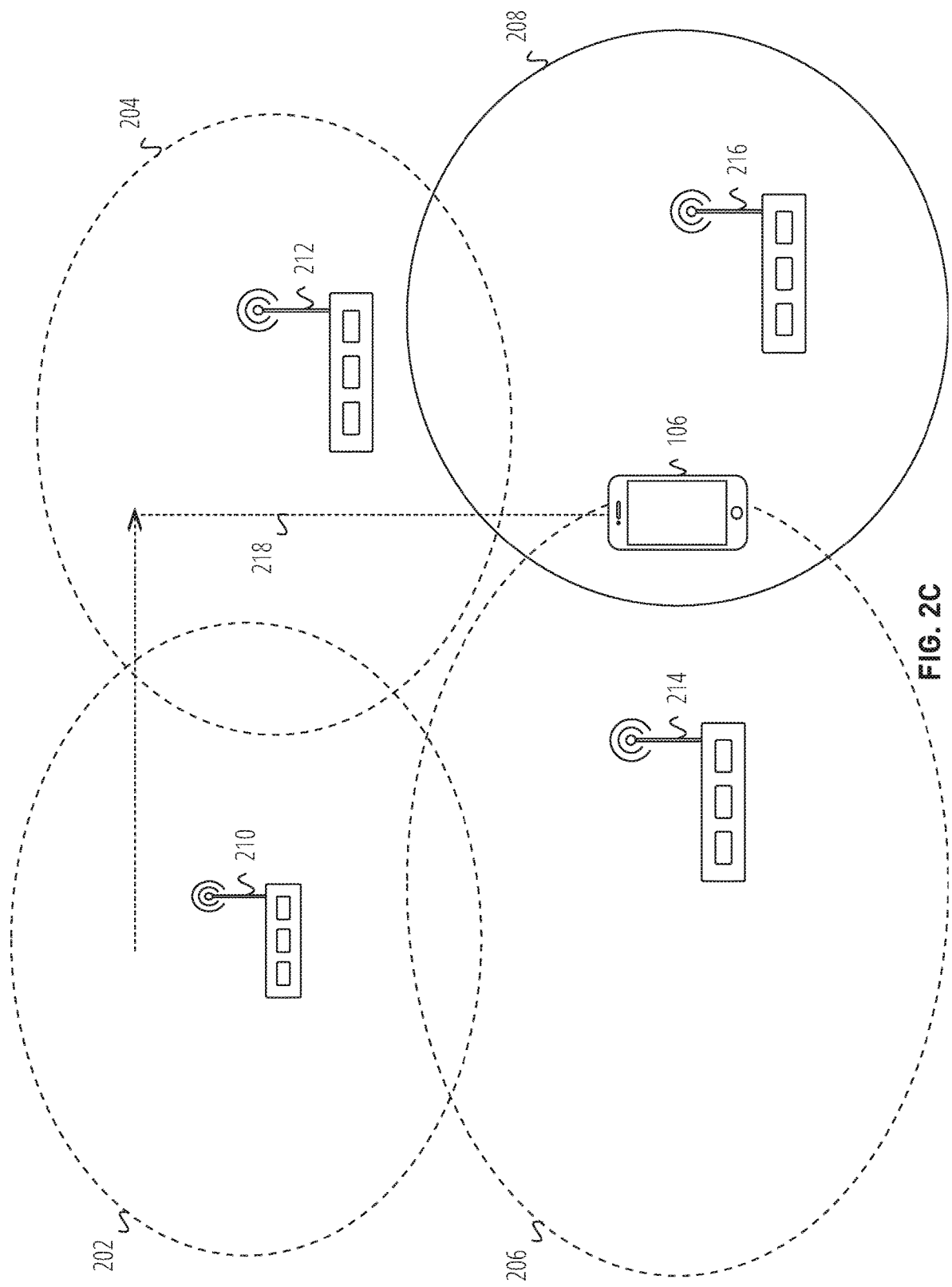
FIG. 2C illustrates a client device moving along a path according to various examples.

FIG. 2A, FIG. 2B, FIG. 2C illustrate client device 106 moving along a path 218 while a computing task is being performed. In various examples, the infrastructure computing devices do not know path 218 ahead of time. Consider that client device 106 is connected to network infrastructure computing device 210 via a 5G cellular connection and that network infrastructure computing device 210 is itself part of the 5G cellular network infrastructure. Accordingly, network infrastructure computing device 210 may maintain a listing of identifiers (e.g., IMEI) of devices that network infrastructure computing device 210 provides 5G access. As the devices move in and out of coverage range 202, network infrastructure computing device 210 may handoff cellular connection responsibilities to other infrastructure computing devices using traditional methods which are beyond the scope of this disclosure. In various examples, the tasks associated with the handoff of the cellular responsibilities from one base station to another base station are not considered computing tasks in the context of this disclosure.

In addition to its responsibilities as a provider of 5G cellular services, network infrastructure computing device 210 may perform computing tasks on behalf of devices within coverage range 202. As part of this performance, network infrastructure computing device 210 may have specialized functionality to track the progress of these computing tasks (e.g., those tasks beyond those needed for maintaining the cellular connection and the handoff thereof).

For each computing task, network infrastructure computing device 210 may store data related to the computing task (e.g., computing task data), authentication tokens related to the performance, status information with respect to the computing task, and an identifier of the client device that initiated the computing task. The computing task data may have originated from client device 106 when the computing task was initially started. For example, computing task data may be a video file to be processed. Client device 106 may also have authenticated itself to an electronic service associated with the video file (e.g., an app provider) before the computing task could begin. In response to the authentication, one or more authentication tokens (e.g., session IDs, certificates) may have been received by client device 106. These authentication tokens may be transmitted to network infrastructure computing device 210 so network infrastructure computing device 210 can authenticate itself to the electronic service if needed. The status information may indicate the completion status of the computing task as discussed above with respect to computing task management 116.

A path prediction component (e.g., configured as path prediction component 114) of network infrastructure computing device 210 may execute a software routine to determine a set of possible future locations for devices currently associated with network infrastructure computing device 210 such as client device 106. As discussed previously, path prediction component 114 may use a number of techniques to obtain a set of possible future locations (e.g., encoded as a set of geographic coordinates) and associated likelihoods with each location.

For example, when client device 106 is moving at a certain speed in a certain direction—as may be ascertained by client device 106 transmitting its GPS location to network infrastructure computing device 210—the set of possible future locations may include locations along the same direction. In other instances, the set of possible future locations may include locations along a road the client device 106 is moving. In other examples, a machine learning model trained on past user location data may be used to determine the set of possible future locations. The set of possible future locations may be narrowed based on the likelihood calculation. For example, an at least 50% threshold likelihood may be used to remove some of the set of possible future locations.

Once the set of possible future locations has been determined, the locations may be correlated with the coverage ranges of other network infrastructure devices. For example, network infrastructure computing device 210 may include a list of all other network infrastructure computing devices, their location (e.g., coordinates), station identifier, and coverage range (e.g., 1000-meter radius, etc.). By cross referencing the set of possible future locations with the locations in the list, path prediction component 114 may identify a set of network infrastructure computing devices that may be along the path of client device 106. In FIG. 2A it can be seen that path 218 indicates a future location that is within the coverage range 204 of network infrastructure computing device 212.

For one or more of the network infrastructure computing devices in the set of network infrastructure computing devices, network infrastructure computing device 210 may transfer the computing task data, authentication tokens, and status information for any in progress tasks (collectively a task package) for client device 106, Within the context of FIG. 2A, network infrastructure computing device 210 may transfer the task package to network infrastructure computing device 212. In various examples, the task package may be transferred before client device 106 is within coverage range 204 to ensure a quicker and smoother handoff.

FIG. 2B illustrates that client device 106 has now moved beyond coverage range 202 and is now in coverage range 204 associated with network infrastructure computing device 212. Because network infrastructure computing device 212 has received the task package from network infrastructure computing device 210, the computing task for client device 106 may be continued on network infrastructure computing device 212. Additionally, any computing task data, authentication tokens, and status information for client device 106 may be removed from network infrastructure computing device 210 once cellular communications between client device 106 and network infrastructure computing device 210 are terminated and handed off to network infrastructure computing device 212.

Network infrastructure computing device 212 may use the received authentication tokens to authenticate to the electronic service associated with the computing task. For example, consider that the electronic service is a VPN. A session ID may be required to confirm that client device that is associated with the computing task is indeed the same as the client device that was requesting the computing task on network infrastructure computing device 210. If network infrastructure computing device 212 has the authentication token (e.g., the session ID) the electronic service can be assured that client device is the same and the computing task may be continued. In some examples, client device 106 may be required to reauthenticate to the electronic service if, for example, behavioral characteristics of the client device 106 are outside a normal range (e.g., the client device 106 is in a location that does not match with any previous known locations).

Network infrastructure computing device 212 may determine another set of possible future locations using a path prediction component. In various examples, a network infrastructure computing device may determine the set of possible future locations periodically (e.g., every minute). As path 218 indicates, network infrastructure computing device 216 and network infrastructure computing device 214 both overlap the potential future location of client device 106. Accordingly, both of these devices may be part of the set of network infrastructure computing devices identified by network infrastructure computing device 212 to transmit the task package.

FIG. 2C illustrates that client device 106 is now in cellular communication with network infrastructure computing device 216 as evidenced by the solid line of coverage range 208. Once it has been established that network infrastructure computing device 216 will handle cellular duties for client device 106, either network infrastructure computing device 212 or network infrastructure computing device 216 may transmit a command to network infrastructure computing device 214 to delete the received task package. The task package may also be deleted from network infrastructure computing device 212.

Figure 3B:
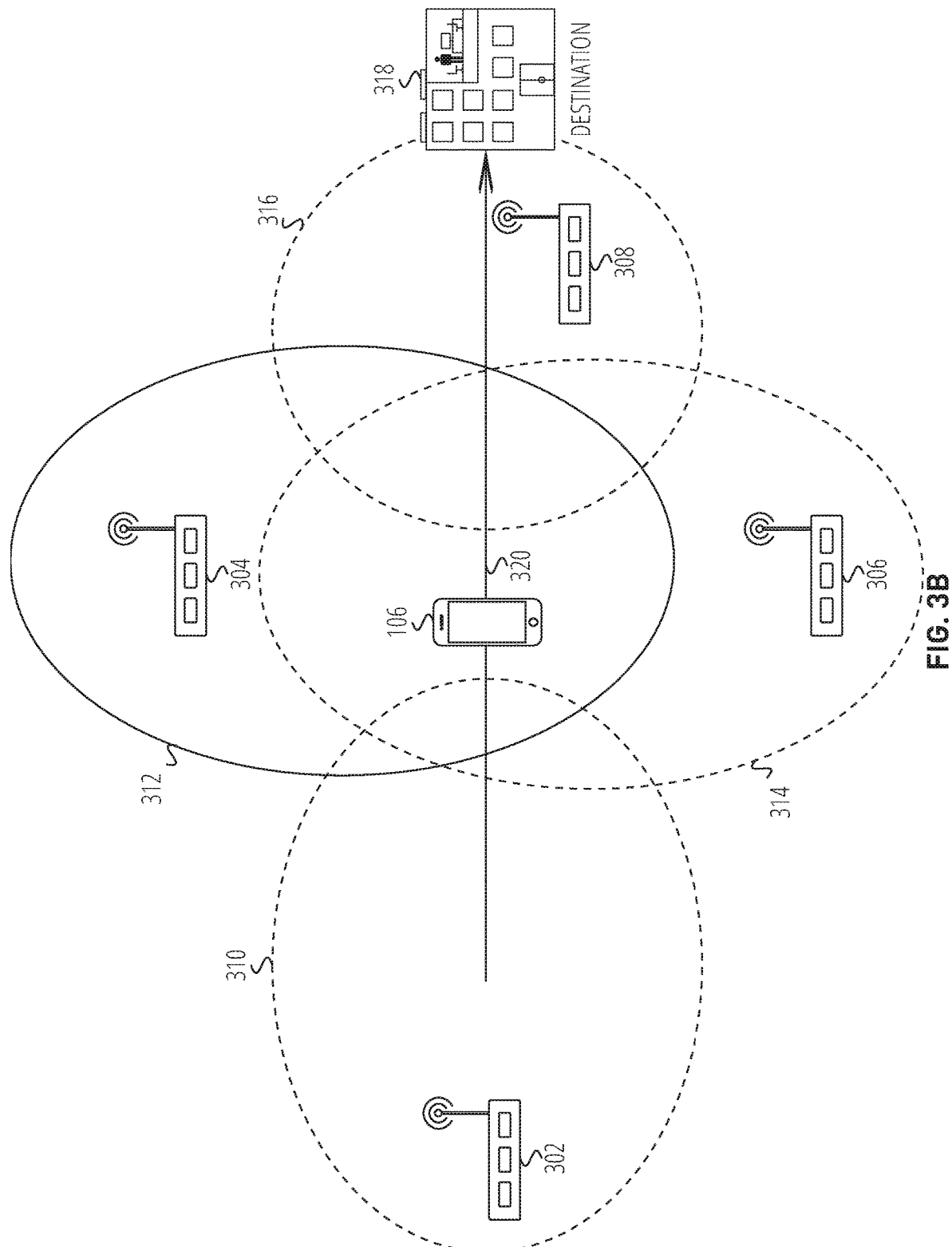
FIG. 3B illustrates a client device moving along a route according to various examples.
Figure 3C:
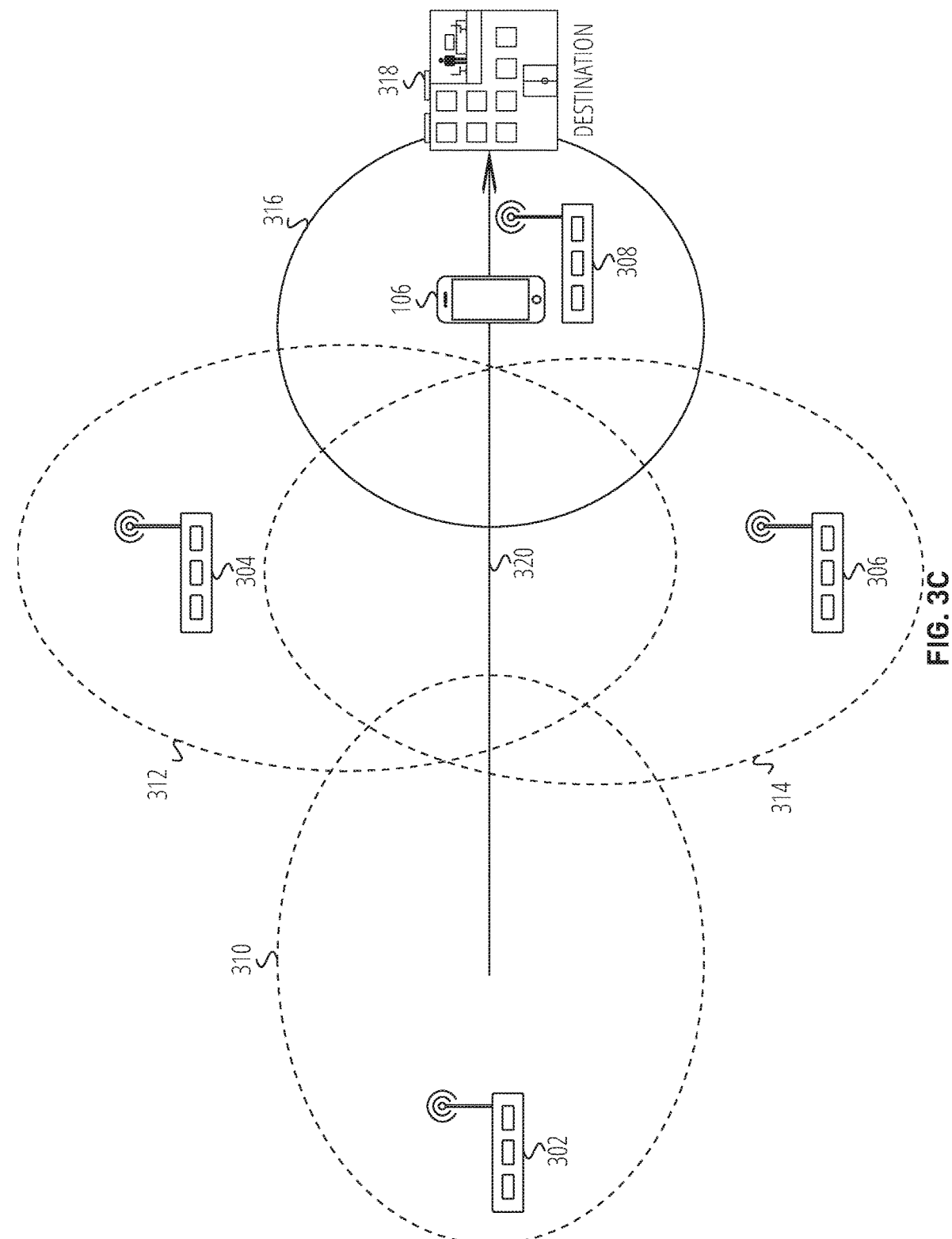
FIG. 3C illustrates a client device moving along a route according to various examples.

FIG. 3A (and FIG. 3B and FIG. 3C) illustrates a client device moving along a route according to various examples. FIG. 3A includes client device 106, network infrastructure computing device 302, network infrastructure computing device 304, network infrastructure computing device 306, network infrastructure computing device 308, coverage range 310, coverage range 312, coverage range 314, coverage range 316, destination 318, and route 320. For purposes of the example use case in FIGS. 3A-3C it may be assumed that route 320 is available to network infrastructure computing devices 302-308 by access granted to a navigation app via client device 106. Thus, the network infrastructure computing devices may already know where and approximately when client device 106 will be located.

In various examples, a single company or group of companies may invest in their own 5G infrastructure devices for private use. In such a manner security of the computing task may be enhanced because the computing task data never goes on a public network. Thus, in various examples, handoff component 124 may use not only path data for the set of possible future locations but also ownership interests of the infrastructure devices in determining where to transmit a task package. In various examples, the ownership of a network infrastructure is stored alongside its location, coverage area, etc., as described above.

In the context of FIG. 3A consider that network infrastructure computing device 302, network infrastructure computing device 304, and network infrastructure computing device 308 are part of a private network and network infrastructure computing device 306 is part of a public network. Accordingly, it can be seen that client device 106 is predicted to pass equally through coverage range 312 and coverage range 314 (for network infrastructure computing device 304 and network infrastructure computing device 306, respectively). Because network infrastructure computing devices 302, 304, and 306 are part of the same private network, a handoff component of network infrastructure computing device 302 may give a higher priority to network infrastructure computing device 304 when choosing which device to handoff a task to.

As seen in FIG. 3B, client device 106 is now associated with network infrastructure computing device 304. In instances where a public and private infrastructure device are both available the task package may only be sent to the private infrastructure device in some examples. Finally, at FIG. 3C it can be see that client device 106 is now associated with network infrastructure computing device 308.

Figure 4:
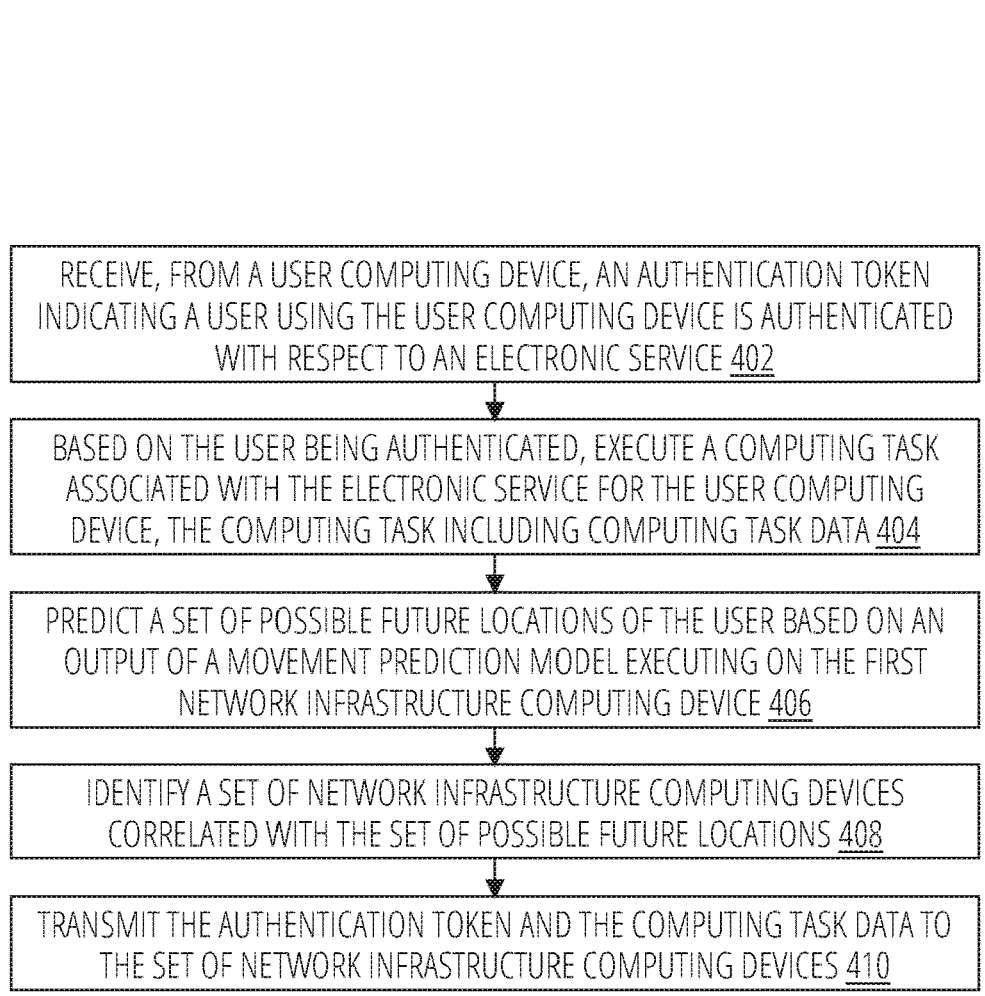
FIG. 4 illustrates a method 400 in accordance with one embodiment.

FIG. 4 is a flowchart illustrating a method, according to various examples. The method is represented as a set of blocks that describe operations 402-408 of the method. The method may be embodied in a set of instructions stored in at least one computer-readable storage device of a computing device(s). A computer-readable storage device excludes transitory signals. In contrast, a signal-bearing medium may include such transitory signals. A machine-readable medium may be a computer-readable storage device or a signal-bearing medium. The computing device(s) may have one or more processors that execute the set of instructions to configure the one or more processors to perform the operations illustrated in FIG. 4. The one or more processors may instruct other component of the computing device(s) to carry out the set of instructions. For example, the computing device may instruct a network device to transmit data to another computing device or the computing device may provide data over a display interface to present a user interface.

In various examples, method 400 is performed at a first network infrastructure computing device (e.g., such as application server 102) of a plurality of networked infrastructure computing devices.

In operation 402, method 400 receives, from a user computing device (e.g., client device 106), an authentication token indicating a user using the user computing device is authenticated with respect to an electronic service. The authentication token may be a session ID in various examples.

In operation 404, method 400 based on the user being authenticated, executes a computing task associated with the electronic service for the user computing device, the computing task including computing task data.

In operation 406, method 400 predicts a set of possible future locations of the user based on an output of a movement prediction model (e.g., using path prediction component 114) executing on the first network infrastructure computing device. In various examples, the movement prediction model is executed on a remote device and the output of the execution is received by the first network infrastructure computing device.

In operation 408, method 400 identifies a set of network infrastructure computing devices correlated with the set of possible future locations. In operation 410, method 400 transmits the authentication token and the computing task data to the set of network infrastructure computing devices.

The method may also include where the first network infrastructure computing device communicates with the user computing device over a cellular connection and where the sets of network infrastructure computing devices are part of a cellular network.

The method may also, at the first network infrastructure computing device, narrowing the set of network infrastructure computing devices based on common ownership of the electronic service and respective network infrastructure computing devices in the set of network infrastructure computing devices.

The method may also include from the first network infrastructure computing device, transmitting a state (e.g., status information) of the computing task to the set of network infrastructure computing devices. The state may be used by the second network infrastructure computing device to know where (within the computing task data, for example, such as two minutes into a video file) to continue working on the computing task.

The method may also include receiving, at the first network infrastructure computing device, an indication that the computing task has been handed off to a second network infrastructure computing device of the plurality of networked infrastructure computing devices. The indication may be a transmission from the second network infrastructure computing device indicating the handoff is complete.

The method may also include where the number of network infrastructure computing devices in the set of network infrastructure computing devices is at least two, and for each network infrastructure computing device in the set of network infrastructure computing devices that is not the second network infrastructure computing device, transmitting an instruction to delete the authentication token and computing task data.

The method may also include, at the second network infrastructure computing device, continuing execution of the computing task while foregoing authentication with the electronic service.

The method may also include, at the first network infrastructure computing device, retrieving device data from the user computing device, accessing past user data associated with the user, and inputting the device data and past user data into the movement prediction model.

Figure 5:
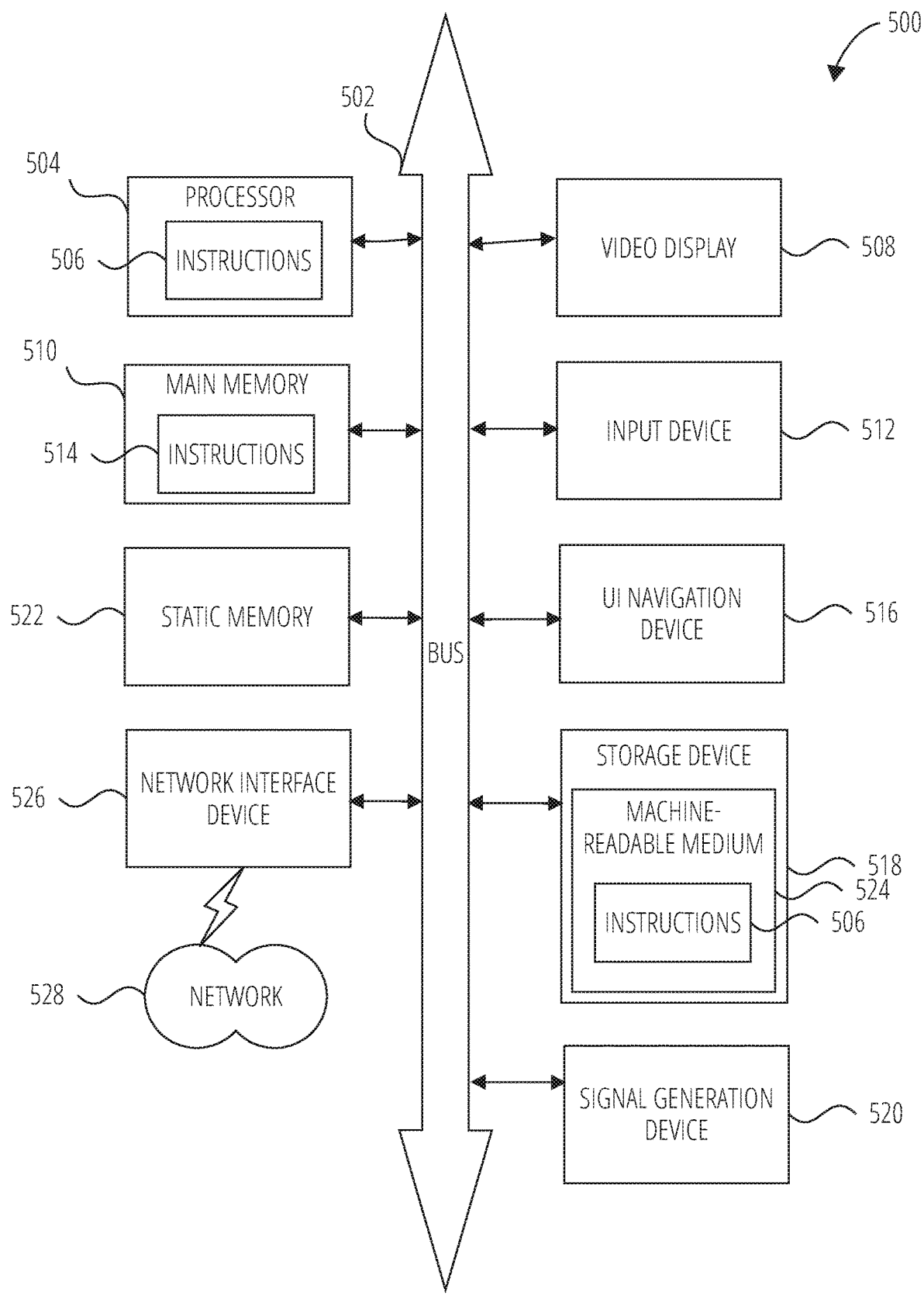
FIG. 5 is a block diagram illustrating a machine in the example form of computer system, within which a set or sequence of instructions may be executed to cause the machine to perform any one of the methodologies discussed herein, according to various examples.

FIG. 5 is a block diagram illustrating a machine in the example form of computer system 500, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client Network environments, or it may act as a peer machine in peer-to-peer (or distributed) Network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 500 includes at least one processor 504 (e.g., a central processing unit (CPU), a graphics processing unit (GPU) or both, processor cores, compute nodes, etc.), a main memory 510 and a static memory 522, which communicate with each other via a bus 502. The computer system 500 may further include a video display 508, an input device 512 (e.g., a keyboard), and a user interface (UI) navigation device 114 (e.g., a mouse). In one embodiment, the video display 508, input device 512, and UI navigation device 516 are incorporated into a single device housing such as a touch screen display. The computer system 500 may additionally include a storage device 518 (e.g., a drive unit), a signal generation device 520 (e.g., a speaker), a network interface device 526, and one or more sensors (not shown), such as a global positioning system (GPS) sensor, compass, accelerometer, or other sensors.

The storage device 518 includes a machine-readable medium 524 on which is stored one or more sets of data structures and instructions 514 (e.g., software) embodying or utilized by any one or more of the methodologies or functions described herein. The instructions 514 may also reside, completely or at least partially, within the main memory 510, static memory 522, and/or within the processor 504 during execution thereof by the computer system 100, with the main memory 510, static memory 522, and the processor 504 also constituting machine-readable media.

While the machine-readable medium 524 is illustrated in an example embodiment to be a single medium, the term "machine-readable medium" may include a single medium or multiple media (e.g., a centralized or distributed Database, and/or associated caches and servers) that store the one or more instructions 514. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. A computer-readable storage device may be a machine-readable medium 524 that excluded transitory signals.

The instructions 514 may further be transmitted or received over a communications Network 126 using a transmission medium via the network interface device 526 utilizing any one of a number of well-known transfer protocols (e.g., HTTP). Examples of communication networks include a local area Network (LAN), a wide area Network (WAN), the Internet, mobile telephone networks, plain old telephone (POTS) networks, and wireless data networks (e.g., Wi-Fi, 3G, 4G LTE/LTE-A, 5G, or WiMAX networks). The term "transmission medium" shall be taken to include any intangible medium that is capable of storing, encoding, or carrying instructions for execution by the machine, and includes digital or analog communications signals or other intangible medium to facilitate communication of such software.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein

What is claimed is:

1. A method comprising:
   at a first network infrastructure computing device of a plurality of networked infrastructure computing devices:
   receiving, from a user computing device, an authentication token indicating a user using the user computing device is authenticated with respect to an electronic service;
   based on the user being authenticated, executing a computing task associated with the electronic service for the user computing device, the computing task including computing task data;
   predicting a set of possible future locations of the user based on an output of a movement prediction model executing on the first network infrastructure computing device;
   accessing a stored list of a set of network infrastructure computing devices, wherein the list identifies location information and ownership information of network infrastructure computing devices in the set;
   identifying, using the location information in the stored list, a set of network infrastructure computing devices correlated with the set of possible future locations;
   narrowing, using the ownership information in the stored set, the set of network infrastructure computing devices to a narrowed set of network infrastructure computing devices having common ownership of the electronic service and respective network infrastructure computing devices in the set of network infrastructure computing devices; and
   transmitting a task package to the narrowed set of network infrastructure computing devices, the task package including the authentication token, the computing task data, and status information, wherein the status information identifies progress of the computing task and where to continue work with respect to the computing task data.

2. The method of claim 1,
   wherein the first network infrastructure computing device communicates with the user computing device over a cellular connection; and
   wherein the narrowed set of network infrastructure computing devices are part of a cellular network.

3. The method of claim 1, further comprising:
   from the first network infrastructure computing device, transmitting a state of the computing task to the narrowed set of network infrastructure computing devices.

4. The method of claim 1, further comprising:
   receiving, at the first network infrastructure computing device, an indication that the computing task has been handed off to a second network infrastructure computing device of the plurality of networked infrastructure computing devices.

5. The method of claim 4, wherein the number of network infrastructure computing devices in the narrowed set of network infrastructure computing devices is at least two, and for each network infrastructure computing device in the narrowed set of network infrastructure computing devices that is not the second network infrastructure computing device, transmitting an instruction to delete the authentication token and computing task data.

6. The method of claim 4, further comprising at the second network infrastructure computing device:
   continuing execution of the computing task while foregoing authentication with the electronic service.

7. The method of claim 1, at the first network infrastructure computing device:

retrieving device data from the user computing device;
accessing past user data associated with the user; and
inputting the device data and past user data into the movement prediction model.

8. A computing apparatus comprising:
a processor; and
a memory storing instructions that, when executed by the processor, configure the apparatus to:
at a first network infrastructure computing device of a plurality of networked infrastructure computing devices:
receive, from a user computing device, an authentication token indicating a user using the user computing device is authenticated with respect to an electronic service;
based on the user being authenticated, execute a computing task associated with the electronic service for the user computing device, the computing task including computing task data;
predict a set of possible future locations of the user based on an output of a movement prediction model executing on the first network infrastructure computing device;
access a stored list of a set of network infrastructure computing devices, wherein the list identifies location information and ownership information of network infrastructure computing devices in the set;
identify, using the location information in the stored list, a set of network infrastructure computing devices correlated with the set of possible future locations;
narrow, using the ownership information in the stored set, the set of network infrastructure computing devices to a narrowed set of network infrastructure computing devices having common ownership of the electronic service and respective network infrastructure computing devices in the set of network infrastructure computing devices; and
transmit a task package to the narrowed set of network infrastructure computing devices, the task package including the authentication token, the computing task data, and status information, wherein the status information identifies progress of the computing task and where to continue work with respect to the computing task data.

9. The computing apparatus of claim 8, wherein the first network infrastructure computing device communicates with the user computing device over a cellular connection and wherein the narrowed set of network infrastructure computing devices are part of a cellular network.

10. The computing apparatus of claim 8, wherein the instructions further configure the apparatus to:
from the first network infrastructure computing device, transmit a state of the computing task to the narrowed set of network infrastructure computing devices.

11. The computing apparatus of claim 8, wherein the instructions further configure the apparatus to:
receive, at the first network infrastructure computing device, an indication that the computing task has been handed off to a second network infrastructure computing device of the plurality of networked infrastructure computing devices.

12. The computing apparatus of claim 11, wherein the number of network infrastructure computing devices in the narrowed set of network infrastructure computing devices is at least two, and
for each network infrastructure computing device in the set of network infrastructure computing devices that is not the second network infrastructure computing device, transmit an instruction to delete the authentication token and computing task data.

13. The computing apparatus of claim 11, wherein the instructions configure the apparatus to, at the second network infrastructure computing device:
continue execution of the computing task while foregoing authentication with the electronic service.

14. The computing apparatus of claim 8, wherein the instructions further configure the apparatus to, at the first network infrastructure computing device:
retrieve device data from the user computing device;
access past user data associated with the user; and
inputting the device data and past user data into the movement prediction model.

15. A non-transitory computer-readable storage medium, the computer-readable storage medium including instructions that when executed by at least one processor, cause the at least one processor to:
at a first network infrastructure computing device of a plurality of networked infrastructure computing devices:
receive, from a user computing device, an authentication token indicating a user using the user computing device is authenticated with respect to an electronic service;
based on the user being authenticated, execute a computing task associated with the electronic service for the user computing device, the computing task including computing task data;
predict a set of possible future locations of the user based on an output of a movement prediction model executing on the first network infrastructure computing device;
access a stored list of a set of network infrastructure computing devices, wherein the list identifies location information and ownership information of network infrastructure computing devices in the set;
identify, using the location information in the stored list, a set of network infrastructure computing devices correlated with the set of possible future locations;
narrow, using the ownership information in the stored set, the set of network infrastructure computing devices to a narrowed set of network infrastructure computing devices having common ownership of the electronic service and respective network infrastructure computing devices in the set of network infrastructure computing devices; and
transmit a task package to the narrowed set of network infrastructure computing devices, the task package including the authentication token, the computing task data, and status information, wherein the status information identifies progress of the computing task and where to continue work with respect to the computing task data.

16. The computer-readable storage medium of claim 15, wherein the first network infrastructure computing device communicates with the user computing device over a cellular connection; and
wherein the narrowed set of network infrastructure computing devices are part of a cellular network.

17. The computer-readable storage medium of claim 15, wherein the instructions further configure the at least one processor to:

from the first network infrastructure computing device, transmitting a state of the computing task to the narrowed set of network infrastructure computing devices.

* * * * *